United States Patent
Kikuchi et al.

(10) Patent No.: US 10,493,362 B2
(45) Date of Patent: Dec. 3, 2019

(54) GAME DEVICE THAT CONTROLS INCENTIVE TO RESTORE EXECUTION PERMISSION VALUE, METHOD OF GAME PROCESSING THAT CONTROLS INCENTIVE TO RESTORE EXECUTION PERMISSION VALUE, AND ARCADE GAME DEVICE THAT CONTROLS INCENTIVE TO RESTORE EXECUTION PERMISSION VALUE

(71) Applicant: KABUSHIKI KAISHA SEGA Games, Tokyo (JP)

(72) Inventors: Tomio Kikuchi, Tokyo (JP); Daisuke Kubota, Tokyo (JP); Ryotaro Okamoto, Tokyo (JP)

(73) Assignee: Kabushiki Kaisha Sega Games, Tokyo (JP)

( * ) Notice: Subject to any disclaimer, the term of this patent is extended or adjusted under 35 U.S.C. 154(b) by 121 days.

(21) Appl. No.: 15/668,855

(22) Filed: Aug. 4, 2017

(65) Prior Publication Data
US 2017/0326452 A1 Nov. 16, 2017

Related U.S. Application Data

(63) Continuation of application No. PCT/JP2016/052603, filed on Jan. 29, 2016.

(30) Foreign Application Priority Data

Feb. 4, 2015 (JP) .................................. 2015-020679

(51) Int. Cl.
*A63F 13/30* (2014.01)
*A63F 13/58* (2014.01)
(Continued)

(52) U.S. Cl.
CPC ............ *A63F 13/58* (2014.09); *A63F 13/537* (2014.09); *A63F 13/75* (2014.09);
(Continued)

(58) Field of Classification Search
CPC ........ A63F 13/537; A63F 13/58; A63F 13/75; A63F 13/792; G07F 17/3211; G07F 17/3246; G07F 17/3251
See application file for complete search history.

(56) References Cited

U.S. PATENT DOCUMENTS 8,920,243 B1 * 12/2014 Curtis ..................... A63F 13/61
463/42
2012/0264511 A1 * 10/2012 Marsland ................ H04L 67/38
463/31

(Continued)

FOREIGN PATENT DOCUMENTS

JP  5618221 B2  11/2014

OTHER PUBLICATIONS

Marvel Avenergs Alliance Wiki, "Energy", Sep. 24, 2013, <https://avengersalliance.fandom.com/wiki/Energy?oldid=403622> (Year: 2013).*

(Continued)

*Primary Examiner* — Justin L Myhr
(74) *Attorney, Agent, or Firm* — Osha Liang LLP

(57) ABSTRACT

A game device includes a memory that stores a predetermined value and a processor that subtracts a value corresponding to a game action in a game from the predetermined value while the game action is executed and outputs the subtracted predetermined value to the memory. The processor also increases, as time passes, the predetermined value of which an upper limit is an upper limit value and outputs the increased predetermined value to the memory. When the processor detects payment of a fee or use of a game item
(Continued)

obtained by the payment, the processor adds a first value to the predetermined value that exceeds the restoration upper limit value and outputs, to the memory, the predetermined value to which the first value is added. The first value is greater than a second value that is added to the predetermined value being under the upper limit value.

19 Claims, 11 Drawing Sheets

(51) Int. Cl.
*A63F 13/537* (2014.01)
*G07F 17/32* (2006.01)
*A63F 13/75* (2014.01)
*A63F 13/5375* (2014.01)
*A63F 13/792* (2014.01)

(52) U.S. Cl.
CPC ...... *G07F 17/3211* (2013.01); *G07F 17/3246* (2013.01); *G07F 17/3251* (2013.01); *A63F 13/5375* (2014.09); *A63F 13/792* (2014.09)

(56) References Cited

U.S. PATENT DOCUMENTS

2014/0295943 A1* 10/2014 Shono .................. A63F 13/795
　　　　　　　　　　　　　　　　　　　　　　463/25
2015/0050997 A1* 2/2015 Suzman .................. G06T 19/20
　　　　　　　　　　　　　　　　　　　　　　463/31
2015/0379817 A1* 12/2015 Masui ...................... A63F 13/46
　　　　　　　　　　　　　　　　　　　　　　463/25

OTHER PUBLICATIONS

Notice of Reasons for Refusal issued in corresponding Japanese Patent Application No. 2015-221542 dated Jun. 26, 2019 (8 pages).
Famitsu App., "Convenient function implementation via Ver2.6 update for [Monster strike] "Over-stamina recovery", "Kame-kue Appearance Forecast", and more." Retrieved from URL: <https://app.famitsu.com/20140715_410426/>; Published Jul. 14, 2017 (9 pages).
Hangame, "Monoria—Federation of Sponsorship Events!"; retrieved online URL: <http://casual.hangame.co.jp/notice4.nhn?m=read&view=&bbsid=910&bbstype=notice&gameid=O_PWZ_NOTICE&page=1&docid=1652611; published Jul. 7, 2011 (5 pages).

\* cited by examiner

FIG. 3B

| Story selection (220) | Player name (10 letters) (222) | Support | User name up to 12 letters | | |
|---|---|---|---|---|---|
| 240 | | | Stamina 150/200 | | Stamina restoration |
| | | | Tutorial Village | | |
| | | | First-time adventure, oh boy! (246) | | |
| | | | Consumed stamina: 99 | | |
| | | | Use the tutorial room to win! | | |
| | | | Featured monsters | | |
| | | | Choose stories, starting from the bottom. | | |
| | | | Hello | Next 6 days, double monsters! | |
| | | | Hello | | |
| | | | Hello | Next 6 days, double gils! | |
| | | | First-time adventure, oh boy! | | |
| | | | (248) | | Enter |
| Choose a place, then decide on a story! | | | | | |

GAME DEVICE THAT CONTROLS INCENTIVE TO RESTORE EXECUTION PERMISSION VALUE, METHOD OF GAME PROCESSING THAT CONTROLS INCENTIVE TO RESTORE EXECUTION PERMISSION VALUE, AND ARCADE GAME DEVICE THAT CONTROLS INCENTIVE TO RESTORE EXECUTION PERMISSION VALUE

BACKGROUND

Technical Field

The present invention generally relates to a game device, a method of game processing, and an arcade game device.

Related Art

Conventional arcade game devices installed in a video arcade are used so that a plurality of players can play the same game. It is also possible to play so-called online games, in which game programs are downloaded onto smart phones and other such mobile terminals, with game progress processing performed on the server side, and the processing results displayed at each mobile terminal.

Among such conventional games, there are games in which some kind of cost (such as "stamina") is consumed in order to execute a game action within the game (such as a "quest"), and the consumed stamina is restored as time passes.

In these conventional games, the games cannot be continued once a player's stamina is used up. Therefore, the players of the game can choose either to wait for the stamina to be restored as time passes, or acquire a restoration item by payment of a fee to restore the stamina right away, and continue the game.

When a restoration item acquired by payment is used, what usually happens is that some small portion of stamina ends up being left over. For instance, if the maximum stamina value is 100, and if the current stamina is 28 in a game that consumes 30 units of stamina to perform a quest, then when a restoration item is used at that point, the stamina that was at 28 is fully restored to 100. Whether the stamina is at 0 or at 28, it will become 100 after the restoration item is used, so when the stamina is 28, the player may end up feeling as if he wasted the 28 units of stamina that he originally had. Therefore, typical player behavior is to wait for a stamina level of 28 to be restored to 30, perform one quest that consumes a stamina of 30, and only then use the restoration item.

Also, in a game in which 30 units of stamina are consumed in order to perform a quest with a relatively high reward and 10 units of stamina are consumed to perform a quest with a relatively low reward, if the current stamina level is at 21, typical player behavior is to reluctantly perform two quests that consume 10 units of stamina to earn a reward and then use the restoration item, in order to avoid losing all 21 units of the stamina.

However, constant waiting around for stamina to be restored during the game may cause to drag down the tempo of the game. Patent Literature 1 has disclosed technologies to increase stamina over the restoration upper limit value for stamina by payment of a fee.

Patent Literature 1: Japanese Patent No. 5,618,221

With the technique disclosed in Patent Literature 1, however, stamina can be increased beyond the restoration upper limit value for stamina by payment of a fee (or using a purchased item), but when the restoration upper limit value for stamina is exceeded, there is no restoration of stamina over time. Accordingly, a player may feel that a state of being at less than the restoration upper limit value in which stamina is restored over time is better than a state of being at or above the restoration upper limit value in which stamina is not restored over time. As a result, a player who wants to play a game a set number of times breaks up the fee payment into smaller payments after waiting for the stamina to drop below the restoration upper limit value, rather than paying the fee in a lump sum, which ends up slowing down the tempo of game play.

SUMMARY

One or more embodiments of the present invention provide a technique with which the tempo of game play can be further increased. In this way, one or more embodiments of the invention provide a technological improvement over conventional systems.

A game device according to one or more embodiments of the present invention comprises execution means for deducting a value corresponding to a game action in a game from an execution permission value in the execution of the game action, time-based restoration means for restoring the execution permission value as time passes, the upper limit of which is a restoration upper limit value, and payment restoration means for increasing the execution permission value, the upper limit of which is a maximum value that is higher than the restoration upper limit value, by payment of a fee or the use of a game item obtained by the payment. When the execution permission value has exceeded the restoration upper limit value, the payment restoration means increases the execution permission value by a value that is higher than when the execution permission value is under the restoration upper limit value.

A program according to one or more embodiments of the present invention is a program for causing a computer to function as execution means for deducting a value corresponding to a game action in a game from an execution permission value in the execution of the game action, time-based restoration means for restoring the execution permission value as time passes, the upper limit of which is a restoration upper limit value, and payment restoration means for increasing the execution permission value, the upper limit of which is a maximum value that is higher than the restoration upper limit value, by payment of a fee or the use of a game item obtained by the payment. When the execution permission value has exceeded the restoration upper limit value, the payment restoration means increases the execution permission value by a value that is higher than when the execution permission value is under the restoration upper limit value.

An arcade game device according to one or more embodiments of the present invention may be installed at a game center. The arcade game device comprises execution means for deducting a value corresponding to a game action in a game from an execution permission value in the execution of the game action, time-based restoration means for restoring the execution permission value as time passes, the upper limit of which is a restoration upper limit value, and payment restoration means for increasing the execution permission value, the upper limit of which is a maximum value that is higher than the restoration upper limit value, by payment of a fee or the use of a game item obtained by the payment. When the execution permission value has exceeded the restoration upper limit value, the payment restoration means increases the execution permission value by a value that is higher than when the execution permission value is under the restoration upper limit value.

According to one or more embodiments of the present invention, a game device may include a memory that stores an execution permission value and a processor that subtracts a value corresponding to a game action in a game from the execution permission value while the game action is executed and outputs the subtracted execution permission value to the memory. The processor increases, as time passes, the execution permission value of which an upper limit is a restoration upper limit value and outputs the increased execution permission value to the memory. When the processor detects payment of a fee or use of a game item obtained by the payment, the processor may add a first value to the execution permission value that exceeds the restoration upper limit value and outputs, to the memory, the execution permission value to which the first value is added. The first value may be greater than a second value that is added to the execution permission value being under the restoration upper limit value.

According to one or more embodiments of the present invention, a method of game processing that cause a computer to execute a program may include storing, with a memory of the computer, an execution permission value, outputting, from a processor of the computer to the memory, the execution permission value from which a value corresponding to a game action in a game is subtracted while the game action is executed, outputting, from the processor to the memory, the execution permission value increased as time passes, wherein an upper limit of the increased permission value is a restoration upper limit value, and outputting, from the processor to the memory, the execution permission value to which a first value is added based on detection of payment of a fee or the use of a game item obtained by the payment when the execution permission value has exceeded the restoration upper limit value. When the first value may be greater than a second value that is added to the execution permission value being under the restoration upper limit value.

According to one or more embodiments of the present invention, an arcade game device that is installed at a game center may include a memory that stores an execution permission value and a processor that subtracts a value corresponding to a game action in a game from the execution permission value while the game action is executed and outputs the subtracted execution permission value to the memory. The processor increases, as time passes, the execution permission value of which an upper limit is a restoration upper limit value and outputs the increased execution permission value to the memory. When the processor detects payment of a fee or use of a game item obtained by the payment, the processor may add a first value to the execution permission value that exceeds the restoration upper limit value and outputs, to the memory, the execution permission value to which the first value is added. The first value may be greater than a second value that is added to the execution permission value being under the restoration upper limit value.

One or more embodiments of the present invention provide a technique with which the tempo of game play can be further increased.

BRIEF DESCRIPTION OF DRAWINGS

FIGS. 3A and 3B show simplified illustrations of the story selection screen displayed on the display device according to one or more embodiments of the present invention.

DETAILED DESCRIPTION

Embodiments of the present invention will be described below through reference to the drawings. However, embodiments of the present invention described below are nothing but examples, and are not intended to exclude the application of various modifications or techniques not specifically expressed below. That is, embodiments of the present invention can be modified in various ways without departing from the gist thereof. Also, in the discussion of the drawings below, portions that are the same or similar will be assigned the same or similar reference signs. The drawings are simplified, and do not necessarily match the actual dimensions, proportions, and so forth. From one drawing to the next, there may be portions in which the dimensional relations and proportions are not the same.

Figure 1:
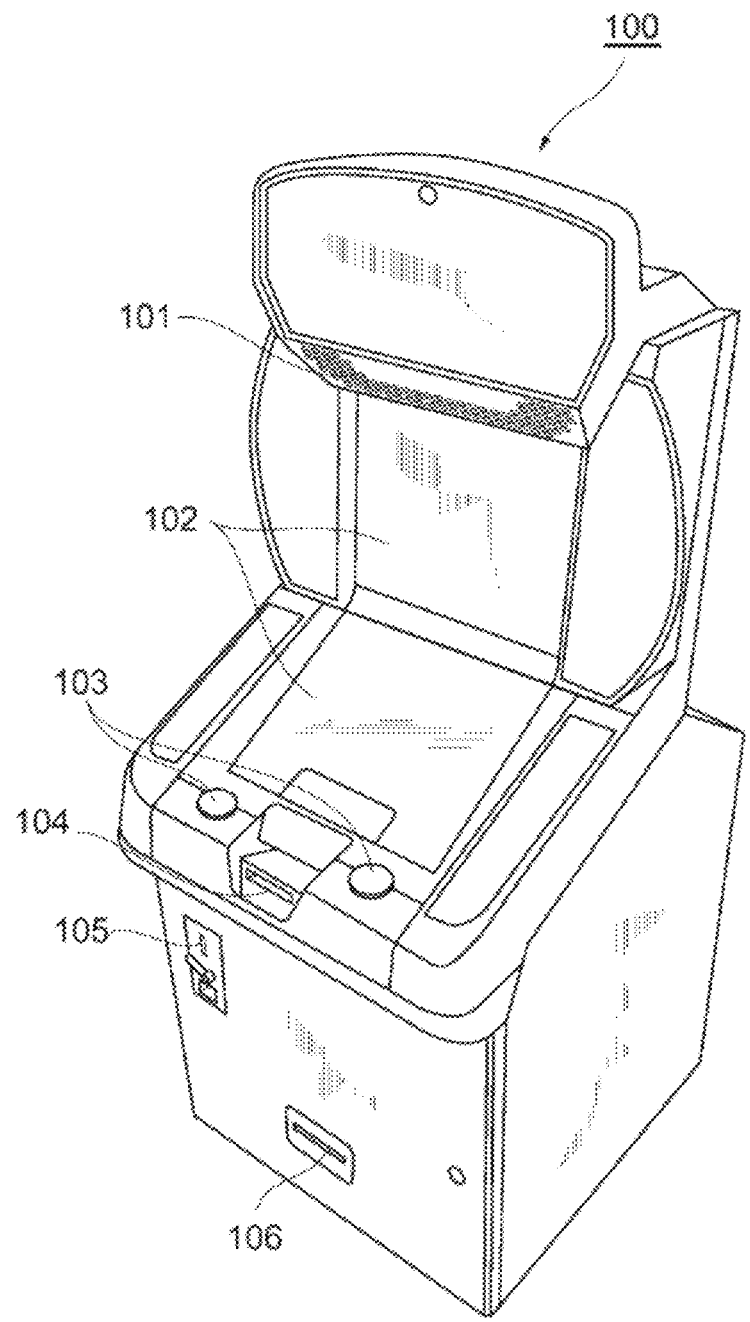
FIG. 1 is an oblique view of the front exterior of a game device according to one or more embodiments of the present invention.

A game device and program in one or more embodiments of the present invention will be described through reference to the drawings. FIG. 1 is an oblique view of the front exterior of a game device according to one or more embodiments of the present invention.

A game device 100 shown as an example in FIG. 1 is a type of so-called arcade game device, which are installed in video arcades in locations all over Japan, for example. The game device 100 is used, for instance, to play new puzzle role-playing games in which players accomplish quests and which incorporate a falling blocks-type puzzle game (in one or more embodiments of the present invention, a game called "Puyo Puyo" (registered trademark)) into a battle between the player of the game device 100 and his opponent.

The game device 100 differs from an arcade game device that is installed in an ordinary video arcade in that players do not need to deposit coins, and can play the game for free as long as there is some stamina (discussed below) left. This is an arcade game device that employs the basic free play (called free to play, or F2P) business model. Also, by depositing coins, players can obtain credit according to the coins that were deposited, and can spend this credit to purchase game items and so forth (discussed below).

Example of Configuration of Game Device

First, an example of the configuration of this game device 100 will be described.

The game device 100 comprises a speaker 101, two displays 102, two control buttons (hereinafter referred to as an "operation input device") 103, a card reader 104, a coin deposit apparatus 105, and a card dispenser 106. The speaker 101 outputs voice instructions for the game, sound effects, and the like. The displays 102 are comprised by an upper and a lower display, and display images for expressing or performing the game (still pictures, moving pictures, video, etc.). The operation input device 103 is comprised by left and right buttons, which are used to input commands from the player to the game device. The card reader 104 reads information from a card owned by the player. The coin deposit apparatus 105 accepts coins, tokens, and so forth deposited by the player as the price of game play. The card dispenser 106 dispenses cards to the player.

A card holds an ID that can be identified by the game device 100. In one or more embodiments of the present invention, paper cards are printed with a barcode indicating a unique ID, and these cards are stored in the card dispenser 106 of the game device 100. This allows the unit price for each card to be kept low, and makes it possible for a card to be dispensed for each game. Also, in one or more embodiments of the present invention, the ID corresponding to the barcode printed on the card is used as player identification information.

Figure 2:
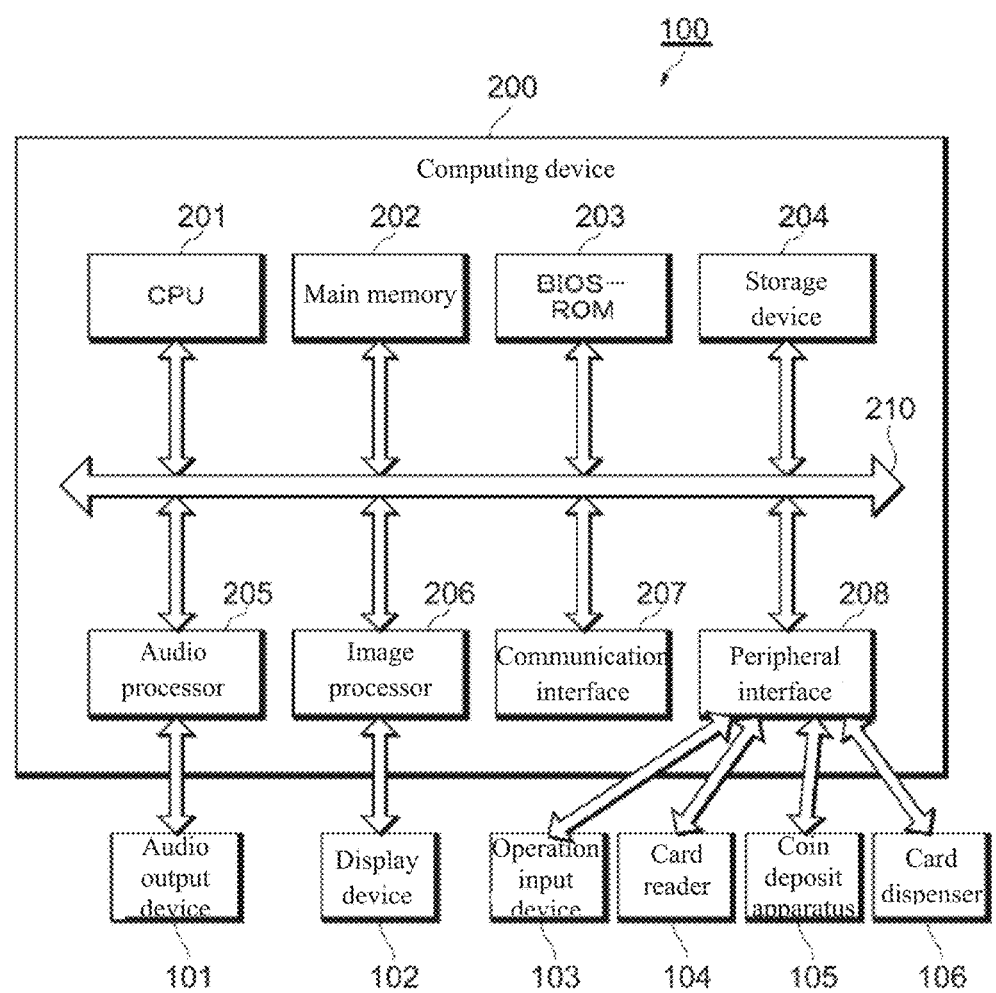
FIG. 2 is a simplified block diagram of the hardware configuration of the game device according to one or more embodiments of the present invention.

The hardware configuration of the game device 100 will be described through reference to FIG. 2. As shown in FIG. 2, the game device 100 comprises, for example, a computing device 200, an audio output device 101, a display device 102, the operation input device 103, the card reader 104, the coin deposit apparatus 105, and the card dispenser 106.

The computing device 200 performs overall control of the game device 100. The computing device 200 is a computer circuit element including a chip set, for example, that is composed of various processors, memory, and so forth. The computing device 200 in one or more embodiments of the present invention includes, for example, a CPU (or processor) 201, a main memory 202, a BIOS-ROM 203, a storage device 204, an audio processor 205, an image processor 206, a communication interface 207, a peripheral interface 208, and a system bus 210 that connects these.

The CPU 201 executes a game program that is deployed on the main memory 202, and causes the computing device 200 to realize its various functions. In other words, the computing device 200 executes a game program under control by the CPU 201, and thereby works together with other hardware to realize the game.

The storage device 204 stores programs and various kinds of data. The audio processor 205 performs various kinds of sound processing under control by the CPU 201. The image processor 206 performs various kinds of graphics processing under control by the CPU 201. The communication interface 207 makes it possible to communicate with a server or other game devices. The peripheral interface 208 makes it possible to communicate with the operation input device 103, the card reader 104, the coin deposit apparatus 105, the card dispenser 106, and other such peripheral devices.

Example of Game Contents

An example of the contents of a game provided to the user by the game device 100 in one or more embodiments of the present invention will now be described. This game is realized by having the game device 100 execute a game program under control by the CPU 201.

First, to begin the game, the player puts his card into the card reader 104 of the game device 100, and puts a coin or coins into the coin deposit apparatus 105. Once the coins have been put in, the player owns credit in the game equivalent to the value of the coins.

The game device 100 causes the display device 102 to display a story selection screen corresponding to the ID on the card that was read.

Figure 3A:
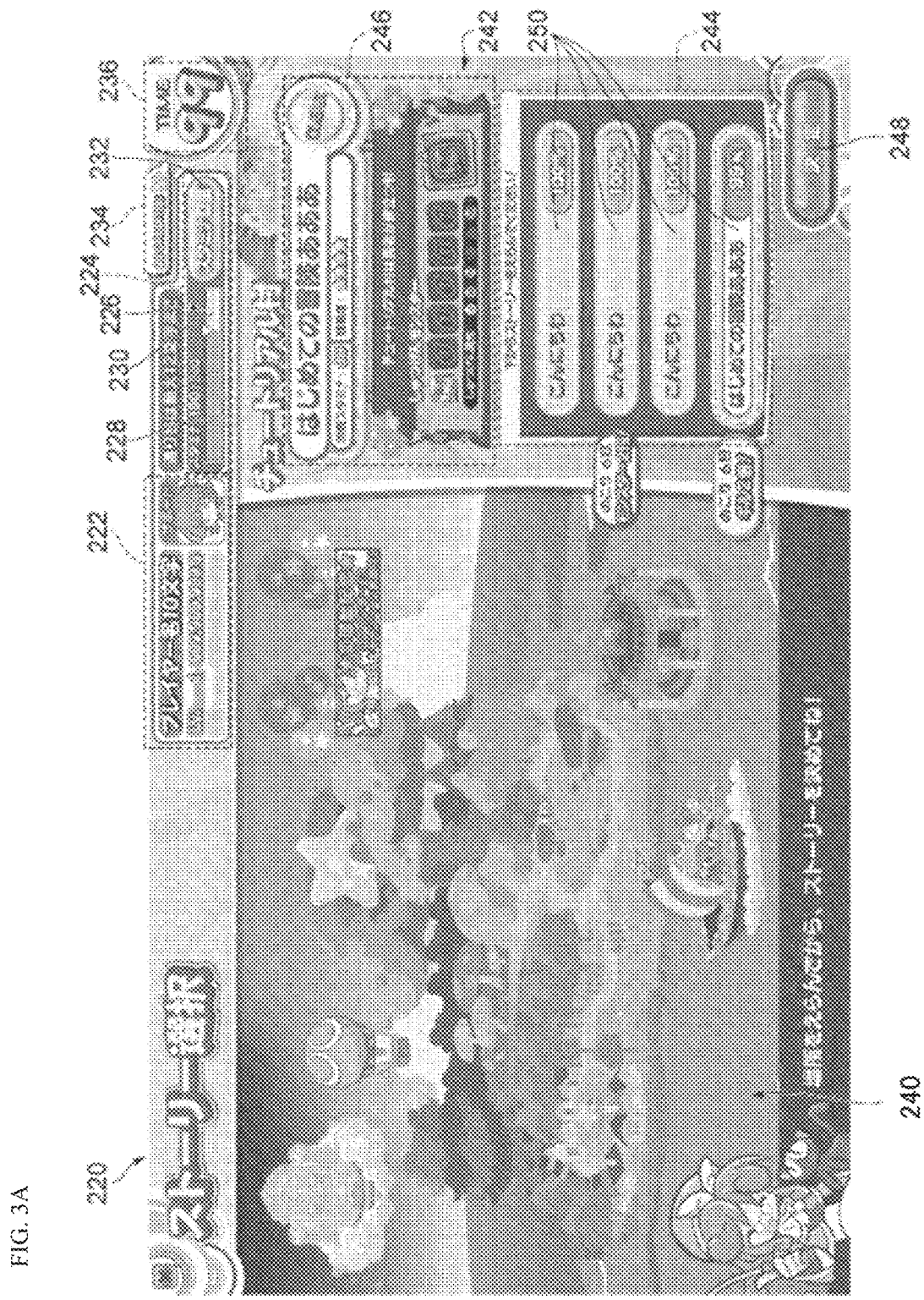

FIG. 3A shows a simplified illustration of the story selection screen 220 displayed on the display device 102. FIG. 3B shows keys corresponding to the simplified illustration of FIG. 3A.

A player information display box 222 is provided at the upper edge in the middle of the story selection screen 220, and displays, for example, the player's name, level, the player's funds in the game, and so on, based on the ID on the card that was read. A stamina display box 224, for example, is provided to the right of the player information display box 222 on the story selection screen 220.

A bar graph 226 that indicates the stamina (the execution permission value according to one or more embodiments of the present invention) is provided, for example, to this stamina display box 224. A bar 228 that indicates the current stamina value and a frame 230 that goes around this bar 228 are provided to the bar graph 226.

The "stamina" here will be described in detail below, but stamina (execution permission value) is consumed whenever a story quest (game action) is executed, and can be restored either by using credit or by waiting for time to pass. When the stamina is consumed down to "0," the game is over. In one or more embodiments of the present invention, the maximum stamina value is set to "200," for example. A stamina restoration button 232 is provided, for example, to the right of the bar graph 226 in the stamina display box 224. This stamina restoration button 232 will be described in detail below, but credit owned by the player is used in response to pressing of the stamina restoration button 232, and stamina is restored.

A credit balance display box 234 that shows the credit balance the player has acquired by payment with coins is provided, for example, to the upper right of the stamina display box 224 on the story selection screen 220.

A time display box 236 that shows a decreasing game running time, for example, is provided to the right of the stamina display box 224 on the story selection screen 220.

A map area 240 that extends from the middle to the left end is provided to the story selection screen 220. In this map area 240, the player can select the place where he wants to play in the game by input with the operation input device 103.

A place details display area 242, in which are displayed details about the place selected by the player, is provided to the right of the map area 240 on the story selection screen 220. This place details display area 242 is provided, for example, with a story selection box 244, a story details display box 246, an enter button 248, and so forth.

A plurality of story selection buttons 250 for choosing one of a plurality of stories in the selected place are provided to the story selection box 244. When the player uses the operation input device 103 to select (press) one of the story selection buttons 250 from among the plurality of story selection buttons 250, the selected story selection button 250 is activated (becomes brighter, for example). Details about the story corresponding to the selected story selection button 250 are shown in the story details display box 246.

The story name, the difficulty of the story, the amount of stamina consumed by executing that story (hereinafter referred to as "consumed stamina"), monsters and the like that appear in the story, and so forth are displayed in the story details display box 246. This "consumed stamina" varies depending on the type of quest, and, for example, is set to a higher value the higher is the difficulty (e.g., if the difficulty is 3, the consumed stamina is 30, if the difficulty is 4, the consumed stamina 40, etc.).

The enter button 248 is used to begin the story corresponding to the selected story selection button 250 when the player uses the operation input device 103 to press a button. When the enter button 248 is pressed and the story begun, the consumed stamina is deducted from the current stamina, and the quest in the story is executed. The quest will not be discussed in detail, but as mentioned above, it incorporates a falling blocks-type puzzle game (Puyo Puyo) into a battle between the player and his enemy (a monster).

Example of Functional Components of Game Device 100

Figure 4:
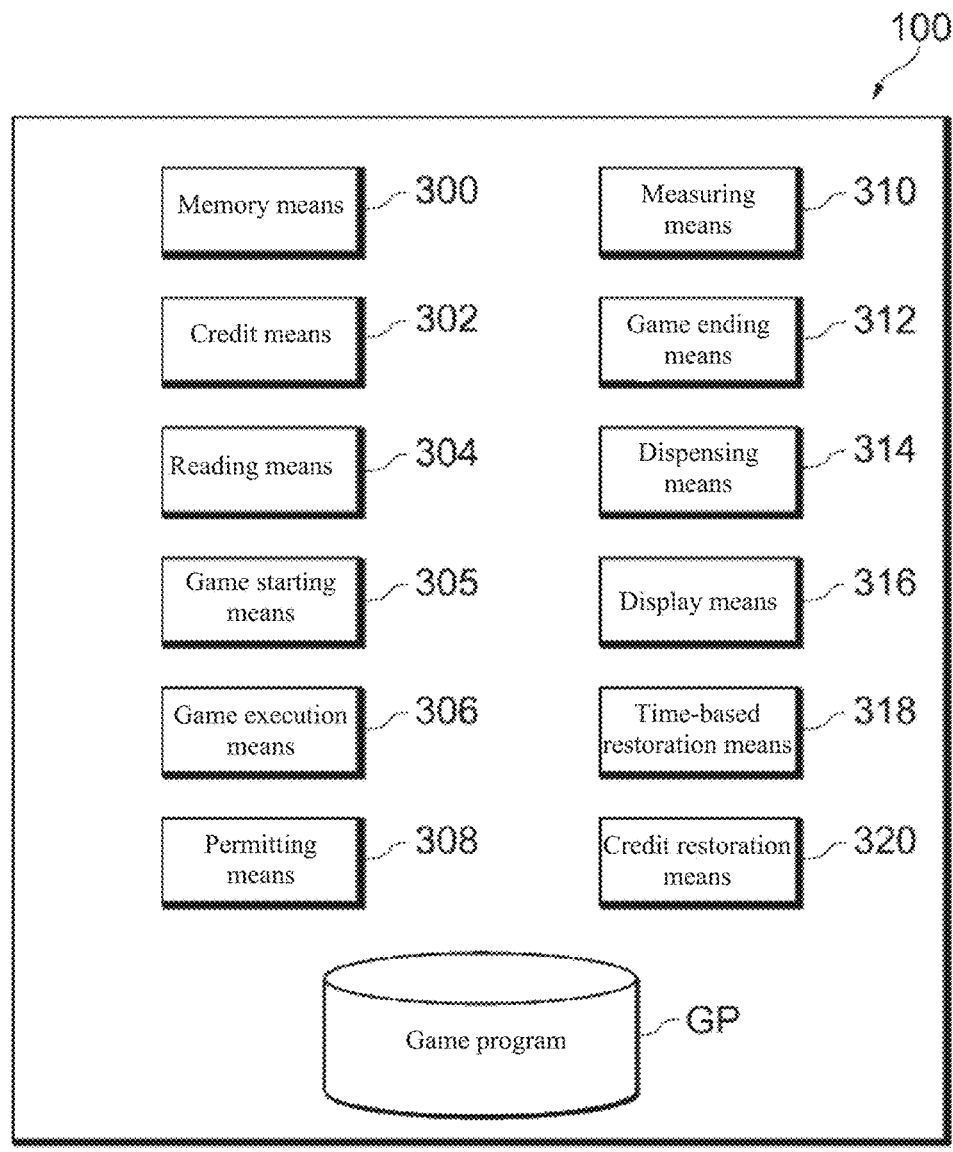
FIG. 4 is a functional block diagram showing, in blocks, the functional components of the game device according to one or more embodiments of the present invention.

The functional components of the game device 100 in one or more embodiments of the present invention will now be described. FIG. 4 is a functional block diagram showing, in blocks, the functional components of the game device 100 in one or more embodiments of the present invention.

The game device 100 has, for example, a storage means 300, a credit means 302, a reading means 304, a game starting means 305, a game execution means 306, a permitting means 308, a measuring means 310, a game ending means 312, and a dispensing means 314. In one or more embodiments of the present invention, the game device 100 has a display means 316, a time-based restoration means 318, and a credit restoration means 320 as functional components. These functional components are realized by, for example, having the CPU 201 execute the game program stored in the storage device 204 by deploying the main memory 202.

The storage means 300 stores player identification information, credit balance, current stamina, maximum stamina value, and game progress status information, with these associated with each other. The player identification information is ID information that uniquely identifies a player. In one or more embodiments of the present invention, an ID corresponding to the barcode printed on a card is used as player identification information. The credit balance is the remaining number of credits at the end of the previous game. The game progress status information is information related to the status of game progress, such as the point reached in the game at the end of the previous game, such as which quests have been accomplished. The storage means 300 also updates the game progress status information and the credit balance recorded to the storage device 204 in association with an ID on the card when a card has been inserted into the card reader 104 at the end of a game.

The credit means 302 detects coins deposited into the coin deposit apparatus 105, converts those coins into credits corresponding to the value of the coins, and adds those credits to the credits stored in the storage means 300.

The reading means 304 reads player identification information from the card inserted into the card reader 104.

The game starting means 305 starts a game by switching the display on the display device 102 from a standby screen (an advertising screen) to the game screen, in response to the acquisition of information about operation of the operation input device 103 by the player and in response to the acquisition of player identification information by the reading means 304.

The game execution means 306 executes a quest as a game action in one or more embodiments of the present invention, in exchange for deducting a value corresponding to the quest from the stamina (execution permission value) in the game, in response to the acquisition of a permission notification from the permitting means 308, for example. That is, the game execution means 306 deducts a value corresponding to the quest from the stamina in executing a game action. With a conventional arcade game device, a specific coin or coins had to be deposited to start the game or to execute a game action. With the game device 100 in one or more embodiments of the present invention, however, the player can start the game without depositing any coins and, as long as the current stamina is at or over the stamina to be consumed corresponding to the quest, that quest can be executed as a game action without depositing any coins.

The permitting means 308 is comprised by, for example, the CPU 201, the main memory 202, a game program GP, etc. At the start of execution by the game execution means 306, this permitting means 308 deducts the stamina to be consumed corresponding to a quest from the current stamina stored in the storage means 300, for example, immediately before the enter button 248 shown in FIG. 3A is pressed and the quest of a given story is executed, and sends the game execution means 306 a permission notification, thereby permitting the execution of the quest.

Figure 5:
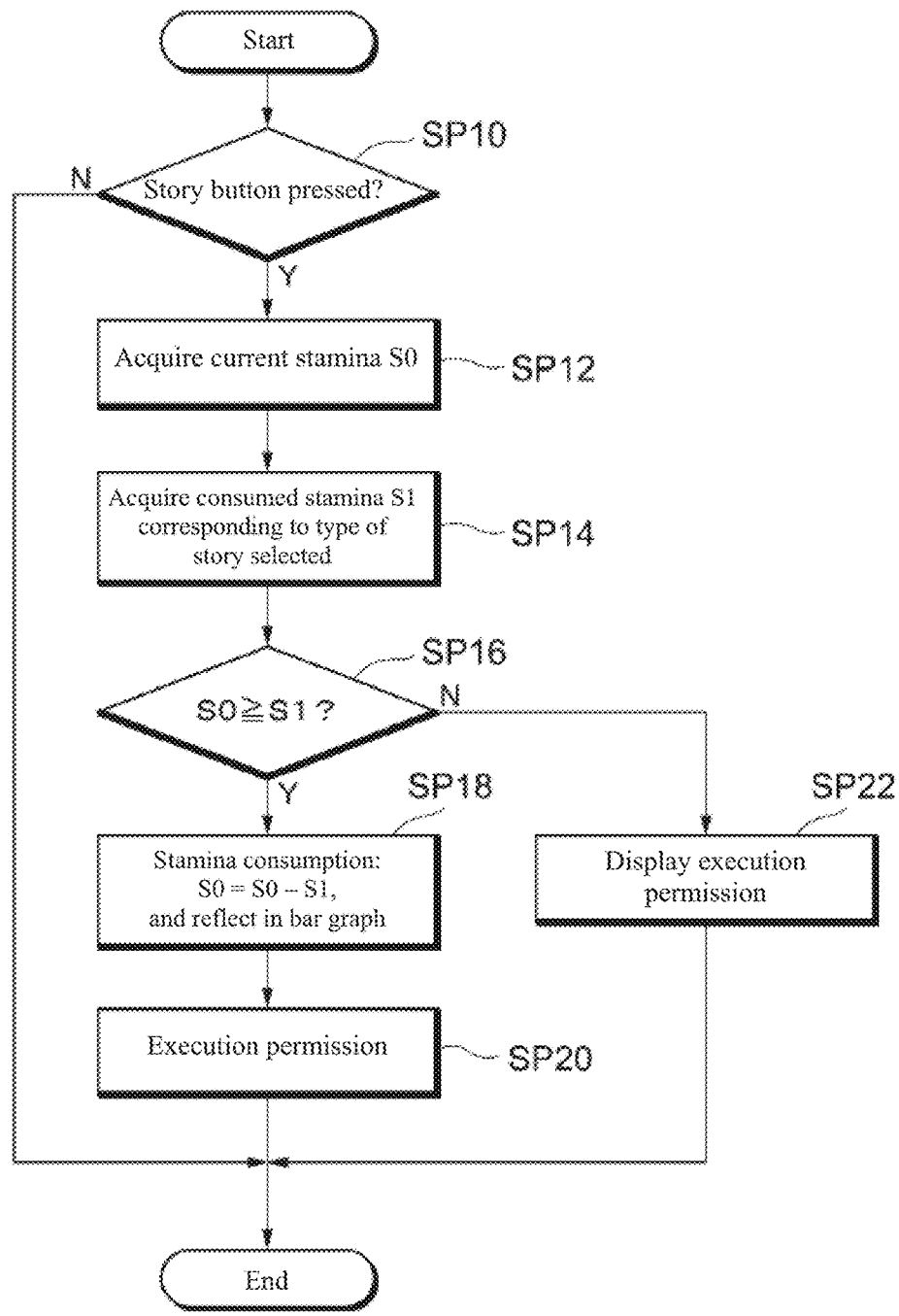
FIG. 5 is a flowchart showing the flow of processing of a permitting means according to one or more embodiments of the present invention.

More specifically, the permitting means 308 performs the processing shown in FIG. 5. FIG. 5 is a flowchart showing the flow of processing of the permitting means 308. The processing in this flowchart is repeated once every second, for example, on the story selection screen 220 shown in FIG. 3A. The identification reference signs in parentheses below correspond to the step identification reference signs in the drawing.

(SP10) The permitting means 308 determines whether or not the enter button 248 shown in FIG. 3A has been pressed. The permitting means 308 moves to the processing in step SP12 if the determination is positive, and ends all processing if the determination is negative.

(SP12) The permitting means 308 acquires the current stamina S0 from the storage means 300. The permitting means 308 then moves to the processing of step SP14.

(SP14) The permitting means 308 acquires the consumed stamina S1 corresponding to the type of story selected by the player. The permitting means 308 then moves to the processing of step SP16.

(SP16) The permitting means 308 determines whether or not the current stamina S0 is at or over the consumed stamina S1 (S0≥S1). If the determination is positive, the flow moves to the processing of step SP18, and if the determination is negative, the flow moves to the processing of step SP22.

(SP18) The permitting means 308 performs stamina consumption. More specifically, the consumed stamina S1 is deducted from the current stamina S0 (S0=S0−S1). The stamina S0 after this deduction is stored as the current stamina S0 in the storage means 300. Consequently, the display means 316 reflects the deduction result in the bar 228 for current stamina shown in FIG. 3A. The permitting means 308 then moves to the processing of step SP20.

(SP20) The permitting means 308 sends the game execution means 306 a permission notification without any coins being deposited by the player. This makes it possible for the game execution means 306 to execute the quest. The permitting means 308 then ends all processing.

(SP22) The permitting means 308 causes the display means 316 to display a message on the story selection screen 220 to the effect that the quest cannot be executed. Also displayed are messages prompting the player for payment, such as "deposit coins" or "use credit," etc. The permitting means 308 then ends all processing.

Returning to FIG. 4, the measuring means 310 will be described. The measuring means 310 measures how long the game is in progress. The measured value is shown as the occasion demands in the time display box 236 shown in FIG. 3A.

The game ending means 312 ends the game when the player decides that he wants to end the game at a specific point and has selected the game end button, etc. The "specific point" here is the point when the player selects the game end button on the map screen, selects "Do not continue" on the continue screen displayed when the player has failed in a conquest in the story, or selects "Do not continue game" on the result screen after a conquest in the story.

The dispensing means 314 dispenses a card when the game is over, if no card was inserted into the card reader 104 before the start of the game.

The display means 316 is comprised by, for example, the display device 102, the CPU 201, the main memory 202, a game program, etc. This display means 316 performs display control over the stamina bar 228 and the story selection screen 220 shown in FIG. 3A. In addition to giving a display that prompts for payment, the display means 316 also makes the background of the bar graph 226 the same color as the bar 228 when, for example, the current stamina S0 exceeds a restoration upper limit value predetermined by the time-based restoration means 318 (discussed below) (a value that is lower than the maximum stamina value), and makes the background of the bar graph 226 a different color from that of the bar 228 when the current stamina S0 is at or below the restoration upper limit value (such as "100"). As a specific example, the display means 316 makes the color of the frame 230 or the color inside the frame 230 the same blue as the bar 228 when the stamina exceeds the restoration upper limit value, and makes the color of the frame 230 or the color inside the frame 230 red, which is different from the color (blue) of the bar 228.

As time passes, the time-based restoration means 318 restores the current stamina S0 that has been deducted by the permitting means 308 over time, using the restoration upper limit value as the upper limit. There are no particular restrictions on the time interval between restorations or the extent to which stamina is restored over time, but for example, the stamina S0 can be set to be restored by "1" every three minutes. Once the current stamina S0 reaches the restoration upper limit value, no further time-based restoration is performed.

Figure 6:
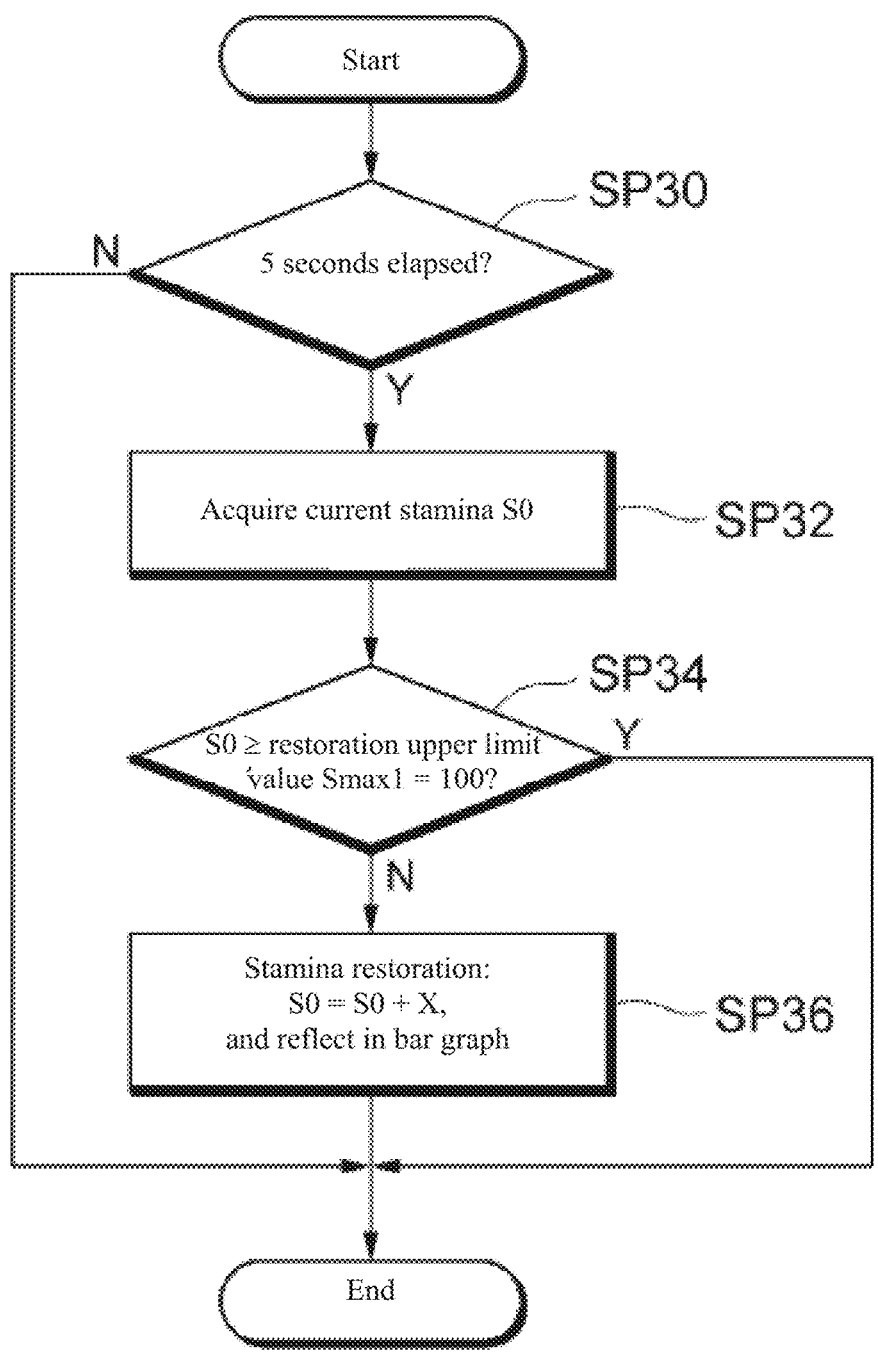
FIG. 6 is a flowchart showing the flow of processing of a time-based restoration means according to one or more embodiments of the present invention.

More specifically, the time-based restoration means 318 performs the processing shown in FIG. 6. FIG. 6 is a flowchart showing the flow of processing by the time-based restoration means 318 when the current stamina S0 is restored by "X" every five minutes. The processing in this flowchart is repeated every second on the story selection screen 220 shown in FIG. 3A. The identification reference signs in parentheses below correspond to the step identification reference signs in the drawing.

(SP30) The time-based restoration means 318 determines whether or not five seconds, for example, have elapsed since the previous time-based restoration. The time-based restoration means 318 moves to the processing in step SP32 if the determination is positive, and ends all processing if the determination is negative.

(SP32) The time-based restoration means 318 acquires the current stamina S0 from the storage means 300. The time-based restoration means 318 then moves to the processing of step SP34.

(SP34) The time-based restoration means 318 determines whether or not the current stamina S0 is at or over a restoration upper limit value Smax1 (such as "100") (S0≥Smax1). The time-based restoration means 318 ends all processing if the determination is positive, and moves to the processing of step SP36 if the determination is negative.

(SP36) The time-based restoration means 318 restores the current stamina S0 over time. More specifically, the time-based restoration means 318 adds a numerical value X (such as "2") to the current stamina S0 (S0=S0+X). The stamina S0 after this addition is then stored as the current stamina S0 in the storage means 300. Consequently, the display means 316 reflects the addition result in the current stamina bar 228 shown in FIG. 3A. If, for example, "2" or more is added to the current stamina S0 here, the current stamina S0 shall not exceed the restoration upper limit value Smax1. If, for example, the current stamina S0 is "99," the extent of time-based restoration is 2, and the restoration upper limit value Smax1 is "100," then the time-based restoration means 318 restores the current stamina S0 to 100, and the remaining "1" of time-based restoration is rounded off. The time-based restoration means 318 then ends all processing.

Returning to FIG. 4, the credit restoration means 320 will be described. The credit restoration means 320 makes use of credits (that is, items obtained by the payment of a fee), and adds a value using a value that is higher than the restoration upper limit value Smax1 as the upper limit value (hereinafter referred to as the "maximum value" or "maximum increase value"), rather than using the restoration upper limit value Smax1 as the upper limit for the current stamina S0 (that is, the value of the current stamina S0 can be increased beyond the restoration upper limit value Smax1). Specifically, the credit restoration means 320 allows the current stamina S0 to be restored to the restoration upper limit value Smax1, and further allows the current stamina S0 to be increased beyond the restoration upper limit value Smax1, using the maximum increase value as the upper limit. The credit restoration means 320 can also increase the value of the current stamina S0 by using the maximum increase value as the upper limit, according to the payment of a fee, rather than according to the use of credits.

Also, if the player attempts to increase the current stamina S0 by the use of credits when the current stamina S0 exceeds the restoration upper limit value Smax1 (or when the value of the current stamina S0 is equal to the restoration upper limit value Smax1), the credit restoration means 320 can add to the current stamina S0 a value that is higher than when the current stamina S0 is lower than the restoration upper limit value Smax1 (for example, adding a value that is 10% higher).

The value of the stamina (execution permission value) added by the credit restoration means 320 restores by a value that is no more than the difference between the restoration upper limit value Smax1 and the maximum stamina value when the current stamina S0 is lower than the restoration upper limit value Smax1.

Figure 7:
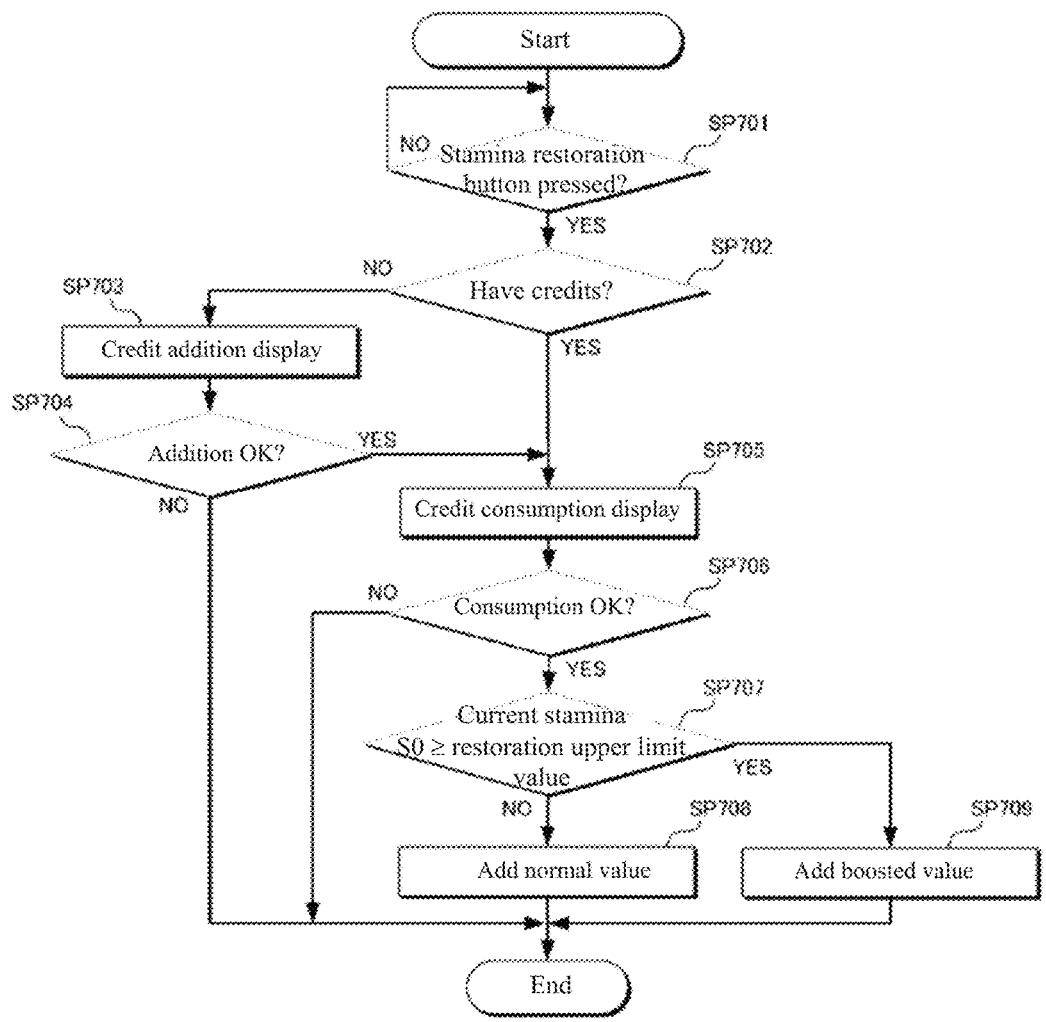
FIG. 7 is a flowchart showing the flow of processing of a credit restoration means according to one or more embodiments of the present invention.

A specific example of the flow of processing by the credit restoration means 320 will now be described through reference to FIG. 7. The identification reference signs in parentheses below correspond to the step identification reference signs in the drawing.

(SP701) The credit restoration means 320 determines whether or not the stamina restoration button 232 has been pressed. If it is determined that the stamina restoration button 232 has been pressed, the processing proceeds to step SP702.

(SP702) The credit restoration means 320 refers to the storage means 300 to determine whether or not the current credit balance is at or over a specific value (for example, "1," which is the lowest number of credits required to restore stamina). If the determination is positive, the processing moves to the processing in step SP705, but if the determination is negative, the processing moves to step SP703.

Figure 8:
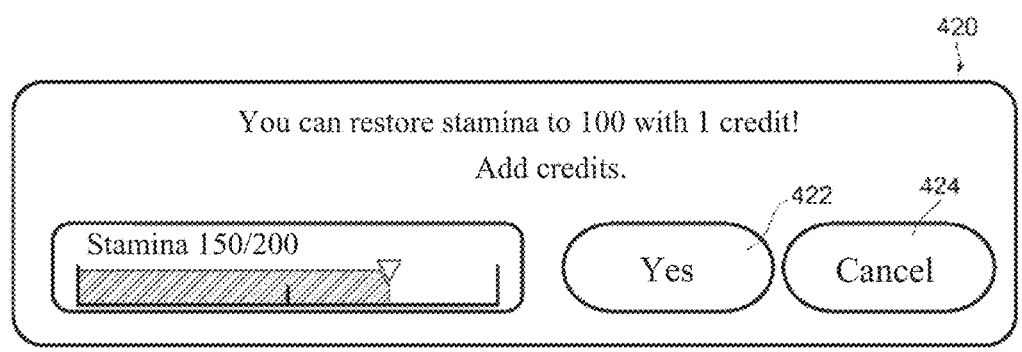
FIG. 8 is a diagram illustrating a dialog box displayed by the credit restoration means according to one or more embodiments of the present invention.

(SP703) The credit restoration means 320 causes the display means 316 to display the dialog box 420 shown in FIG. 8, for instance, on the story selection screen 220. In this dialog box 420 is displayed, for example, text reading "You can restore stamina to 100 with 1 credit! Add credits," and a "Yes" button 422, a "Cancel" button 424, etc. The processing then proceeds to step SP704.

(SP704) The credit restoration means 320 determines whether the "Yes" button 422 or the "Cancel" button 424 was pressed in the dialog box 420. If the "Yes" button 422 was pressed, the credit restoration means 320 performs processing for adding credits, and the processing moves to step SP705. If the "Cancel" button 424 was pressed, the processing in FIG. 7 is ended.

Figure 9:
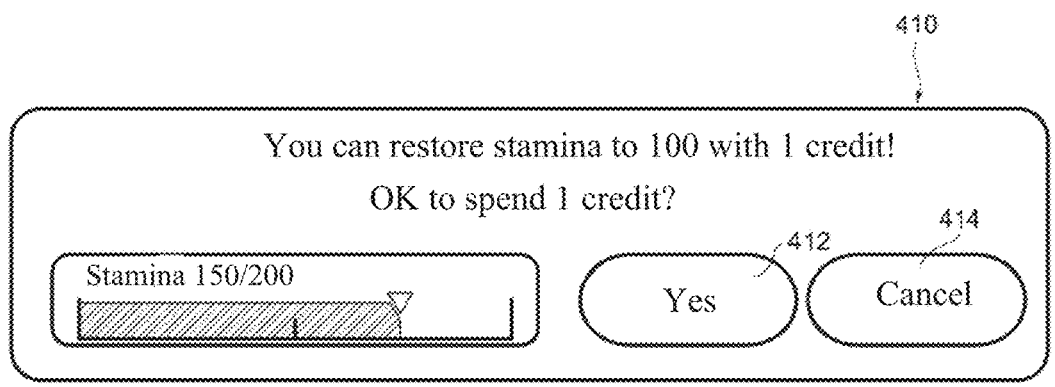
FIG. 9 is a diagram illustrating a dialog box displayed by the credit restoration means according to one or more embodiments of the present invention.

(SP705) The credit restoration means 320 causes the display means 316 to display the dialog box 410 shown in FIG. 9, for example, on the story selection screen 220. In this dialog box 410 is displayed, for example, text reading "You can restore stamina to 100 with 1 credit! OK to spend 1 credit?" and a "Yes" button 412, a "Cancel" button 414, etc. The processing then moves to step SP706.

(SP706) The credit restoration means 320 determines whether the "Yes" button 412 or the "Cancel" button 414 was pressed in the dialog box 410. If the "Yes" button 412 was pressed, the processing moves to step SP707, but if the "Cancel" button 414 was pressed, the processing in FIG. 7 is ended.

(SP707) The credit restoration means 320 determines whether or not the current stamina S0 is at or over the restoration upper limit value Smax1 (S0≥Smax1). If the determination is positive, the processing moves to step SP709, but if the determination is negative, the processing moves to step SP708.

In step SP707, the credit restoration means 320 determines whether or not the current stamina S0 is at or over the restoration upper limit value Smax1, but this is not the only option. For instance, the credit restoration means 320 may determine whether or not the current stamina S0 has exceeded the restoration upper limit value Smax1, or may determine whether or not the current stamina S0 is less than the restoration upper limit value Smax1, but is a value that was preset as a value that is close to the restoration upper limit value Smax1 (for example, "98" when the restoration upper limit value Smax1 is "100"). With a determination such as this, the processing also moves to step SP709 if the determination is positive, and the processing moves to step SP708 if the determination is negative.

(SP708) The credit restoration means 320 uses 1 credit, for example, from the credit balance to add a predetermined value (the usual value) to the current stamina S0 that was deducted by the permitting means 308. For instance, the credit restoration means 320 adds a numerical value Y (such as "100") to the current stamina S0 (S0=S0+Y). The credit restoration means 320 can set this numerical value Y so as to be no more than the difference SS1 between a maximum stamina value Smax2 (maximum value) and the restoration upper limit value Smax1 (Y≤SS1). For instance, when the maximum value Smax2 is "300" and the restoration upper limit value Smax1 is "100," the difference SS1 is "200" (=300−100). After this, the processing in FIG. 7 is ended.

The result of the restoration (addition) of stamina by the credit restoration means 320 may cause the current stamina S0 to exceed the restoration upper limit value Smax1, and the credit restoration means 320 can use the maximum stamina value Smax2 as the upper limit for the addition. The credit restoration means 320 then stores the stamina S0 after addition as the current stamina S0 in the storage means 300. Consequently, the display means 316 reflects the result of the addition in the bar 228 for the current stamina shown in FIG. 3A.

(SP709) The credit restoration means 320 uses 1 credit, for example, from the credit balance to add a predetermined value (a value boosted over the normal value in step SP708) to the current stamina S0 that was deducted by the permitting means 308. For instance, the credit restoration means 320 adds a numerical value Z (such as "110") to the current stamina S0 (S0=S0+Z). The credit restoration means 320 can set this numerical value Z so as to be no more than the difference SS1 between the maximum stamina value Smax2 (maximum value) and the restoration upper limit value Smax1 (Z≤SS1). After this, the processing in FIG. 7 is ended.

When the current stamina S0 is at or over the restoration upper limit value Smax1, in step SP709, stamina is added by a value that is boosted over the normal value (such as Z=Y×1.1), but the amount by which it is boosted can be set as needed. For instance, the boosted amount may be increased according to the amount of difference between the current stamina S0 and the restoration upper limit value Smax1 (for example, if the difference is "10," the boosted amount may be "10," and if the difference is "20," the boosted amount may be "20").

Figure 10:
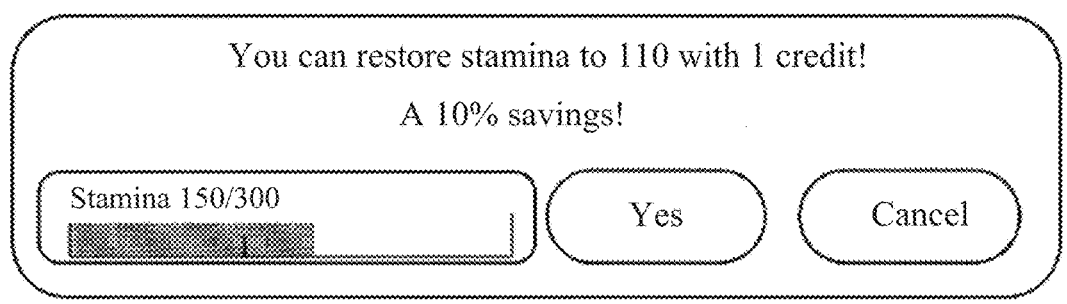
FIG. 10 is a diagram illustrating a dialog box displayed by the credit restoration means according to one or more embodiments of the present invention.

Also, in step SP705, if the current stamina S0 is at or over the restoration upper limit value Smax1, the credit restoration means 320 causes the display means 316 to display the dialog box shown in FIG. 10, for example, on the story selection screen 220. In this dialog box is displayed, for example, text reading "You can restore stamina to 110 with 1 credit! A 10% savings!" Specifically, when the current stamina S0 is at or over the restoration upper limit value Smax1, the display means 316 displays information related to adding stamina by a value that is boosted over the normal value.

Effect of Game Device 100

The effect of the game device 100 will now be described.

First, according to one or more embodiments of the present invention, stamina can be increased beyond the restoration upper limit value Smax1 for stamina by means of credits, which is a purchased item, or the payment of a fee. Furthermore, when the current stamina exceeds the restoration upper limit value Smax1, a value that is boosted over the normal value can be added to the current stamina by means of credits, which is a purchased item, or the payment of a fee.

By contrast, in an ordinary game, when the current stamina is at the restoration upper limit value Smax1 (or when it exceeds the restoration upper limit value Smax1), the stamina is not restored over time. Accordingly, the player may feel that being under the restoration upper limit value, in which there is restoration of stamina over time, is better than being at or over the restoration upper limit value, in which there is no restoration of stamina over time. However, in one or more embodiments of the present invention, as discussed above, when the current stamina exceeds the restoration upper limit value Smax1, a value that has been boosted over the normal value, by means of credits, which is a purchased item, or the payment of a fee, can be added to the current stamina. As a result, the player will not feel that it is disadvantageous to add stamina by means of items, etc., when the current stamina is at or over the restoration upper limit value. This also avoids a situation in which a player who wants to play a game a set number of times breaks up the fee payment into smaller payments after waiting for the stamina to drop below the restoration upper limit value, rather than paying the fee in a lump sum, which ends up slowing down the tempo of game play.

According to one or more embodiments of the present invention, when the current stamina S0 is at or over the restoration upper limit value Smax1, the credit restoration means 320 can increase the amount to be boosted according to the amount of difference between the current stamina S0 and the restoration upper limit value Smax1.

Normally, the more the current stamina S0 exceeds the restoration upper limit value Smax1, the longer it will be before stamina starts to be restored over time again. Therefore, as discussed above, the greater is the value by which the current stamina S0 exceeds the restoration upper limit value Smax1, the more the amount by which stamina is boosted by the credit restoration means 320 is increased, which means that even when the current stamina S0 greatly exceeds the restoration upper limit value Smax1, the player will still not feel that it is disadvantageous to add stamina by means of items or the like.

According to one or more embodiments of the present invention, when the current stamina S0 is at or over the restoration upper limit value Smax1, the credit restoration means 320 causes the display means 316 to provide a display related to the addition of stamina by a value that is boosted over the normal value by the use of items, etc. As a result, when the current stamina S0 is at or over the restoration upper limit value Smax1, the player can find out that there is no disadvantage to adding stamina by the use of items, etc.

MODIFICATION EXAMPLES

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the credit restoration means 320 restores the current stamina S0 by the use of credits obtained by payment in coins, but the current stamina S0 may also be restored simultaneously with payment in coins. Specifically, the credit restoration means 320 may restore stamina directly by the payment of a fee, without the use of indirect game items (credits).

Also, the credit restoration means 320 was described as using credits, but game items other than credits may also be used, such as medicinal herbs, potions, restoration magic, etc.

Also, the content of the game program GP is not limited to the above-mentioned new puzzle role playing games, and may instead be, for example, a simple role playing game, a simple puzzle game, an action game, a fighting game, a shooting game, a gun game, a driving game, a quiz game, a mahjong game, a medal game, a music game, or the like.

Also, the game action in the game is not limited to the above-mentioned execution of a quest, and may instead be the execution of a fighting game, the execution of a shooting game, etc. Furthermore, there may be a plurality of types of game action in the game, or just one type, and there may also be a plurality of types of consumed stamina, or just one type.

Also, what the permitting means 308 deducts is not limited to the term "stamina," and may instead be an execution permission value that is expressed by some other term, such as physical strength, magical spells, power, vitality, credits, hit points (HP), etc. Also, the game action that consumes stamina may not be instigated by the player himself, and can include when stamina is consumed by the game action of another player.

Also, the restoration upper limit value Smax1 and the maximum stamina value Smax2 are not limited to being fixed values of "100" or "200," and may be variables corresponding to the game situation or the player's skill level. For instance, if restoration by the use of credits is constant at "100," the restoration upper limit value Smax1 for stamina at level 1 is "20" and the stamina maximum value Smax2 is "120," while the restoration upper limit value Smax1 for stamina at level 99 is "100" and the maximum stamina value Smax2 is "200." Also, the restoration upper limit value Smax1 for stamina may be added for a fixed period of time (such as one day from the use of an item) by use of a game item obtained by a payment. For example, the maximum stamina value Smax2 may be added by the same amount as the added value for the restoration upper limit value Smax1.

Furthermore, the extent Y of restoration by the use of credits is not limited to a fixed value of "100," and may be a variable corresponding to the player's skill level. For example, the restoration upper limit value Smax1 for stamina at level 1 is "20," the maximum stamina value Smax2 is "40," and the restoration extent Y is "20," and at level 99 the restoration upper limit value Smax1 for stamina is "100," the maximum stamina value Smax2 is "200," and the restoration extent Y is "100."

Also, a case was described in which the stamina had a maximum value Smax2, but the stamina need not have a maximum value Smax2, and may be infinite.

When the difference between the execution permission value and the maximum value of the execution permission value is less than the extent of restoration, the payment restoration means restores the execution permission value by the extent of restoration, and leaves the differential obtained by subtracting the difference between the execution permission value and the maximum value from the extent of restoration, as the game item that restores by an amount equal to this differential.

GP Game Program
10 Network Game System (System)
100 Game Device
103 Operation Input Device (Operation Means)
105 Coin Deposit Apparatus (Acceptance Means)
226 Bar Graph (Bar Display)
228 Bar
230 Frame (Background)
300 Storage Means
305 Game Action Starting Means
306 Game Execution Means (Execution Means)
308 Permitting Means
316 Display Means
318 Time-Based Restoration Means
320 Credit Restoration Means (Payment Restoration Means)
S0 Current Stamina (Execution Permission Value)
S1 Consumed Stamina (Consumption Value)
Smax1 Restoration Upper Limit Value
Smax2 Maximum Stamina Value

What is claimed is:

1. A game device, comprising:
a display;
a memory that stores an execution permission value; and
a processor connected to the memory and the display and that:
subtracts a value corresponding to a game action in a game from the execution permission value while the game action is executed;
outputs the subtracted execution permission value to the memory;
increases, as time passes, the execution permission value of which an upper limit is a restoration upper limit value; and
outputs the increased execution permission value to the memory, wherein
when the processor detects payment of a fee or use of a game item obtained by the payment, the processor adds a first value to the execution permission value that exceeds the restoration upper limit value,
the first value is greater than a second value that is added to the execution permission value when the execution permission value is under the restoration upper limit value, and
the processor outputs, to the memory, the execution permission value to which the first value is added.

2. The game device according to claim 1, wherein a maximum value of the execution permission value to which the first value is added is greater than the restoration upper limit value.

3. The game device according to claim 2, wherein when the execution permission value has exceeded the restoration upper limit value, the processor determines the first value based on a difference between the execution permission value and the restoration upper limit value.

4. The game device according to claim 2, further comprising:
a display that displays information related to the first value when the execution permission value has exceeded the restoration upper limit value.

5. The game device according to claim 1, wherein when the execution permission value has exceeded the restoration upper limit value, the processor determines the first value based on a difference between the execution permission value and the restoration upper limit value.

6. The game device according to claim 5, wherein the processor determines the first value in proportion to an amount of the difference.

7. The game device according to claim 6, further comprising:
a display that displays information related to the first value when the execution permission value has exceeded the restoration upper limit value.

8. The game device according to claim 5, further comprising:
a display that displays information related to the first value when the execution permission value has exceeded the restoration upper limit value.

9. The game device according to claim 1, wherein the display displays information related to the first value when the execution permission value has exceeded the restoration upper limit value.

10. A method of game processing that causes a computer to execute a program, the method comprising:
storing, with a memory of the computer, an execution permission value;
outputting, from a processor of the computer to the memory, the execution permission value from which a value corresponding to a game action in a game is subtracted while the game action is executed;
outputting, from the processor to the memory, the execution permission value increased as time passes, wherein an upper limit of the increased permission value is a restoration upper limit value; and
outputting, from the processor to the memory, the execution permission value to which a first value is added based on detection of payment of a fee or the use of a game item obtained by the payment when the execution permission value has exceeded the restoration upper limit value, wherein
the first value is greater than a second value that is added to the execution permission value when the execution permission value is under the restoration upper limit value.

11. The method according to claim 10, wherein a maximum value of the execution permission value to which the first value is added is greater than the restoration upper limit value.

12. The method according to claim 10, further comprising:
determining, with the processor, the first value based on a difference between the execution permission value and the restoration upper limit value when the execution permission value has exceeded the restoration upper limit value.

13. The method according to claim 12, wherein the determining determines the first value in proportion to an amount of the difference.

14. The method according to claim 10, further comprising:
displaying, with a display of the computer, displays information related to the first value when the execution permission value has exceeded the restoration upper limit value.

15. An arcade game device that is installed at a game center, the arcade game device comprising:
a memory that stores an execution permission value; and
a processor that:
subtracts a value corresponding to a game action in a game from the execution permission value while the game action is executed and outputs the subtracted execution permission value to the memory; and
increases, as time passes, the execution permission value of which an upper limit is a restoration upper limit value and outputs the increased execution permission value to the memory, wherein
when the processor detects payment of a fee or use of a game item obtained by the payment, the processor adds a first value to the execution permission value that exceeds the restoration upper limit value and outputs, to the memory, the execution permission value to which the first value is added, and
the first value is greater than a second value that is added to the execution permission value when the execution permission value is under the restoration upper limit value.

16. The arcade game device according to claim 15, wherein a maximum value of the execution permission value to which the first value is added is greater than the restoration upper limit value.

17. The arcade game device according to claim 15, wherein when the execution permission value has exceeded the restoration upper limit value, the processor determines the first value based on a difference between the execution permission value and the restoration upper limit value.

18. The arcade game device according to claim 17, wherein the processor determines the first value in proportion to an amount of the difference.

19. The arcade game device according to claim 15, further comprising:
   a display that displays information related to the first value when the execution permission value has exceeded the restoration upper limit value.

* * * * *